(12) United States Patent
Meyer et al.

(10) Patent No.: US 9,217,787 B2
(45) Date of Patent: Dec. 22, 2015

(54) APPARATUS AND METHOD FOR CALIBRATING A RADIO POSITIONING BASED POSITION FINDING DEVICE

(71) Applicant: Fraunhofer-Gesellschaft zur Foerderung der angewandten Forschung e.V., Munich (DE)

(72) Inventors: Steffen Meyer, Erlangen (DE); Juergen Hupp, Nuernberg (DE); Thorsten Vaupel, Homberg (DE); Stephan Haimerl, Seubersdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 99 days.

(21) Appl. No.: 13/654,761

(22) Filed: Oct. 18, 2012

(65) Prior Publication Data

US 2013/0289916 A1    Oct. 31, 2013

Related U.S. Application Data

(63) Continuation of application No. PCT/EP2011/056442, filed on Apr. 21, 2011.

(60) Provisional application No. 61/326,754, filed on Apr. 22, 2010.

(30) Foreign Application Priority Data

Sep. 13, 2010    (EP) .................................... 10176470

(51) Int. Cl.
*G01S 5/02*    (2010.01)
(52) U.S. Cl.
CPC .............. *G01S 5/021* (2013.01); *G01S 5/0252* (2013.01)
(58) Field of Classification Search
CPC ................................. G01S 5/0252; G01S 5/02
USPC ........................................................... 702/94
See application file for complete search history.

(56) References Cited

U.S. PATENT DOCUMENTS 6,944,465 B2    9/2005 Spain et al.
2005/0014518 A1    1/2005 Spain, Jr. et al.
(Continued)

FOREIGN PATENT DOCUMENTS

CN    1666561 A    9/2005
CN    101084696 A    12/2007
(Continued)

OTHER PUBLICATIONS

Official Communication issued in International Patent Application No. PCT/EP2011/056442, mailed on Jul. 7, 2011.
(Continued)

*Primary Examiner* — Toan Le
*Assistant Examiner* — Manuel Rivera Vargas
(74) *Attorney, Agent, or Firm* — Keating & Bennett, LLP

(57) ABSTRACT

Described is an apparatus for calibrating a position finding device, having a comparer for comparing a received radio signal pattern to a multitude of reference radio signal patterns, a determiner for determining a signal strength difference, and a determiner for determining a calibration value. The comparer for comparing is configured to select a selection subset from the multitude of reference radio signal patterns by means of a measure of matching between the received radio signal pattern and one reference radio signal pattern, respectively. Determination of the calibration value is based on the signal strength difference, and the determiner for determining the calibration value is further configured to provide the calibration value to the position finding device. Also described are a position finding device for radio-based localization, having such an apparatus for calibrating, a method of calibrating a position finding device based on radio-based localization, and a computer program for performing the method are described.

13 Claims, 7 Drawing Sheets

(56) References Cited

U.S. PATENT DOCUMENTS

| | | | |
|---|---|---|---|
| 2005/0285793 A1* | 12/2005 | Sugar et al. | 342/465 |
| 2006/0089153 A1 | 4/2006 | Sheynblat | |
| 2007/0026870 A1 | 2/2007 | Spain et al. | |
| 2008/0214208 A1* | 9/2008 | Gordon et al. | 455/456.1 |
| 2009/0247185 A1 | 10/2009 | Gilad et al. | |
| 2009/0280827 A1* | 11/2009 | Michaud | 455/456.1 |
| 2010/0278079 A1 | 11/2010 | Meyer et al. | |

FOREIGN PATENT DOCUMENTS

| | | |
|---|---|---|
| DE | 10 2008 036 681 A1 | 7/2009 |
| EP | 1 795 912 A1 | 6/2007 |
| JP | 07-231473 A | 8/1995 |
| JP | 2008-005476 A | 1/2008 |
| WO | 03/092318 A1 | 11/2003 |
| WO | 2004/008796 A1 | 1/2004 |
| WO | 2006/047734 A1 | 5/2006 |
| WO | 2009/086912 A1 | 7/2009 |

OTHER PUBLICATIONS

Lemelson et al., "Automatic Identification of Fingerprint Regions for Quick and Reliable Location Estimation", IEEE, 2010, pp. 540-545.

Jiang et al., "An Enhanced Location Estimation Approach based on Fingerprinting Technique", 2010 International Conference on Communications and Mobile Computing, 2010, pp. 424-427.

Official Communication issued in corresponding Japanese Patent Application No. 2013-505488, mailed on Jan. 7, 2014.

\* cited by examiner

APPARATUS AND METHOD FOR CALIBRATING A RADIO POSITIONING BASED POSITION FINDING DEVICE

CROSS-REFERENCE TO RELATED APPLICATIONS

This application is a continuation of copending International Application No. PCT/EP2011/056442, filed Apr. 21, 2011, which is incorporated herein by reference in its entirety, and additionally claims priority from U.S. Application No. 61/326,754, filed Apr. 22, 2010 and from European Application No. 10176470.2, filed Sep. 13, 2010, all of which are incorporated herein by reference in their entirety.

BACKGROUND OF THE INVENTION

The field of the present invention relates to calibration of a position finding device of a radio-based positioning system, and in particular to calibration with regard to a signal strength of received radio signals.

Different positioning technologies are available for localizing mobile terminals. The probably best-known system for localization and/or navigation in the outdoor domain is the satellite-aided Global Positioning System (GPS). For localization and/or navigation within buildings, or indoors, various approaches have been known, such as infrared systems, RFID (radio frequency identification) systems, or field strength evaluations of IEEE 802.11 WLAN networks (WLAN=wireless local area network). Currently, the GPS system is reliably available only for the outdoor domain. More recent upgrades, such as highly sensitive receivers or the so-called A-GPS (Assisted GPS) represent attempts to utilize the technology also within buildings. In this context, A-GPS combines the satellite-based GPS system with reception of so-called assistance information from cellular mobile radio networks. Presently, however, these technologies do not exhibit the desired average levels of accuracy. Infrared and RFID systems are generally not available with blanket coverage and are tied to specific preconditions.

For wireless network connection of portable devices, the WLAN standard in accordance with IEEE 802.11 has been able to establish itself. It is being continuously developed further, both with regard to the data rate and to the range. Established standards, just as standards that are still in the design phase, enable broad-band data transmission at high data rates and are characterized by a high degree of integration, which enables low-cost hardware. Current PDAs (personal digital assistants) and smartphones mostly have wireless interfaces integrated therein, such as the WLAN mentioned, for example. In addition, Bluetooth is often used, and in the future possibly also WiMAX.

In the case of WLAN, commercial public WLAN access points (so-called hotspots) are now available in many places seeing many visitors. In addition, the strong increase in the propagation of broad-band internet connections (e.g. via DSL) also in private homes has boosted propagation of WLAN as a cost-effective home networking technology. Several studies have revealed that urban areas in many places today exhibit almost blanket coverage of WLAN, or even have an oversupply. In particular places of daily life and of interest to tourists are well-equipped in this respect. Therefore, it is currently convenient to use WLAN as a basic technology for positioning mobile devices. In the future, other technologies will certainly also be employed to which the inventive concept described may also be applied.

Positioning of mobile terminals in WLAN networks may in principle be performed by evaluating the base stations (hotspots or access points) received by a mobile terminal, their respective signal strengths received at the terminal being evaluated, for example. However, WLAN signals are strongly screened off by buildings and other obstacles; in particular in areas with extensive WLAN coverage, there are usually no ideal free-field conditions, since said areas are located in urban areas. Thus, it is not directly possible to infer the distance between a mobile terminal and a base station or any other communication partner from the signal strength and/or field strength measured.

In WLAN-based positioning systems, so-called received-signal-strength fingerprinting is often employed as a basic method. This radio fingerprinting method is based on the assumption that signal strengths of radio signals of several radio stations, said signal strengths being received or receivable at a current location, unambiguously characterize the current location or position. If there is a reference database which contains, for a number of reference locations or reference positions, transmitter IDs of radio stations that are received or receivable there at reference times, and contains the signal strengths of the corresponding radio signals, the current position of the mobile device may be inferred from a set of current measurement values (transmitter IDs and associated signal strength values) in that the currently measured measurement values and the reference values of the database are matched. This matching evaluates for each reference point the level of similarity of its previously recorded measurement values or reference values with the current measurement values of the current position. The reference point(s) exhibiting the highest level of similarity then form a basis of an estimated value of the current location of the mobile terminal.

For a reference database, the signal strength of a radio transmitter receivable at a reference position at a reference measuring time may be determined experimentally by means of reference measurements. This results in a database which contains, for each geographic reference position, a list of radio transmitters (access points) with the respectively associated reception field strength and quality. This list, associated with a reference position, may also be referred to as a reference measurement pack, or reference pack (RP). With a WLAN implementation, such a reference database may be as follows, for example:

| RID | MAC | RSSI | PGS | X | Y | Z | MAPNR | CREATED |
|---|---|---|---|---|---|---|---|---|
| 1 | 00.0D.54.9E.17.81 | 46530 | 100 | 5795 | 15627 | 150 | 0 | 12.03.07 12:42 |
| 1 | 00.0D.54.9E.1A.BA | 67260 | 90 | 5795 | 15627 | 150 | 0 | 12.03.07 12:42 |
| 1 | 00.0D.54.9E.1D.64 | 72002 | 88 | 5795 | 15627 | 150 | 0 | 12.03.07 12:42 |
| 1 | 00.0E.6A.D3.B9.8B | 59531 | 100 | 5795 | 15627 | 150 | 0 | 12.03.07 12:42 |
| 1 | 00.0F.A3.10.07.6C | 46464 | 96 | 5795 | 15627 | 150 | 0 | 12.03.07 12:42 |
| 1 | 00.0F.A3.10.07.FB | 74488 | 94 | 5795 | 15627 | 150 | 0 | 12.03.07 12:42 |
| 1 | 00.0F.A3.10.09.SF | 72375 | 97 | 5795 | 15627 | 150 | 0 | 12.03.07 12:42 |
| 2 | 00.0D.54.9E.17.81 | 54138 | 100 | 14399 | 15451 | 150 | 0 | 12.03.07 12:43 |

-continued

| RID | MAC | RSSI | PGS | X | Y | Z | MAPNR | CREATED |
|---|---|---|---|---|---|---|---|---|
| 2 | 00.0D.54.9E.18.1D | 76560 | 11 | 14399 | 15451 | 150 | 0 | 12.03.07 12:43 |
| 2 | 00.0D.54.9E.1A.BA | 62318 | 94 | 14399 | 15451 | 150 | 0 | 12.03.07 12:43 |
| 2 | 00.0D.54.9E.1D.64 | 71348 | 96 | 14399 | 15451 | 150 | 0 | 12.03.07 12:43 |
| 2 | 00.0E.6A.D3.B9.8B | 45393 | 100 | 14399 | 15451 | 150 | 0 | 12.03.07 12:43 |
| 2 | 00.0F.A3.10.07.6C | 66853 | 96 | 14399 | 15451 | 150 | 0 | 12.03.07 12:43 |
| 2 | 00.0F.A3.10.07.FB | 72251 | 100 | 14399 | 15451 | 150 | 0 | 12.03.07 12:43 |
| 2 | 00.0F.A3.10.09.5F | 70990 | 90 | 14399 | 15451 | 150 | 0 | 12.03.07 12:43 |
| 3 | 00.0D.54.9E.17.81 | 58291 | 100 | 24583 | 15627 | 150 | 0 | 12.03.07 12:43 |
| 3 | 00.0D.54.9E.18.1D | 78610 | 68 | 24583 | 15627 | 150 | 0 | 12.03.07 12:43 |
| 3 | 00.0D.54.9E.1A.BA | 62153 | 98 | 24583 | 15627 | 150 | 0 | 12.03.07 12:43 |
| 3 | 00.0D.54.9E.1D.64 | 64187 | 90 | 24583 | 15627 | 150 | 0 | 12.03.07 12:43 |
| 3 | 00.0E.6A.D3.B9.8B | 32851 | 100 | 24583 | 15627 | 150 | 0 | 12.03.07 12:43 |
| 3 | 00.0F.A3.10.07.6C | 69006 | 96 | 24583 | 15627 | 150 | 0 | 12.03.07 12:43 |
| 3 | 00.0F.A3.10.07.FB | 71749 | 92 | 24583 | 15627 | 150 | 0 | 12.03.07 12:43 |
| 3 | 00.0F.A3.10.09.5F | 71482 | 83 | 24583 | 15627 | 150 | 0 | 12.03.07 12:43 |
| 3 | 00.0F.A3.10.09.80 | 71000 | 40 | 24583 | 15627 | 150 | 0 | 12.03.07 12:43 |

The table contains the following information:
reference position identification (ID) (here: 1, 2, 3),
MAC addresses of the radio transmitters received at the respective reference position,
the reception field strengths of the radio transmitters receivable at the reference position (RSSI=received signal strength indicator; 46.56 signifies −46.56 dBm, for example),
the reference position in Cartesian, metric coordinates (x, y, z), and
the point in time or time stamp of the measurement value capture.

The optional PGS (percentage seen) values indicate the frequency with which the respective station was seen, expressed as a percentage, at the measurement value capture (i.e. PGS=90 means that the station was measured in 9 out of 10 measurements on average).

Additionally, a reference pack may include orientation information containing information about a spatial orientation of a mobile terminal with which the corresponding reference pack was recorded. I.e. the orientation information stores information about the direction in which a mobile terminal was held during calibration of the reference point and/or about the direction in which the mobile terminal was moved during calibration of the reference point. This is of interest particularly when the mobile terminal, such as a WLAN-capable device, is held immediately in front of the body of a user, so that the body may cause shadow effects. Even without said shadow effects caused by the body, additional orientation information may be useful since virtually every antenna has a directional pattern. Therefore, orientation may also be understood to mean, e.g., the spatial alignment of the main lobe of an antenna of a mobile terminal.

The reference data and/or reference packs described are typically created at least during a training phase during operation of the radio-based positioning system and may be acquired in different ways: e.g. manually generating the individual reference points and/or reference packs, generating reference data from a moving measurement, or generating reference data by means of anticipation data for the radio-based positioning system.

As was mentioned above, radio-based positioning by means of fingerprinting above all uses the signal strength values (RSSI) of radio transmitters for position finding. The signal strength observed by the position finding device, i.e. the signal strength as is employed for positioning purposes within the position finding device, may be subject to variations that may be due to different causes. For example, different antennas for measuring WLAN signals might possibly vary widely in terms of quality, especially if this is contemplated against the background that software that is independent of devices and platforms as far as possible is to be employed for WLAN localization on as large a variety of different types of terminals as possible. Such differences in antenna quality have an impact, among other things, on the observed signal levels of the radio signals used for positioning.

In addition to the above-mentioned differences in antenna quality, other causes may also have an impact on the signal levels of radio signals used for positioning. For example, the position finding device may occasionally be carried along in the pocket of a piece of clothing or in a piece of luggage. In such cases, the radio signals are more or less heavily attenuated by the materials of the piece of clothing or piece of luggage.

Since the signal strength and/or the signal level allows conclusions to be drawn about a distance between the position finding device and a radio transmitter transmitting the corresponding radio signal, knowledge of the actually present signal strength (i.e. without any corrupting influences due to different antenna qualities or variable attenuation) may contribute to reliably localizing a current position of the position finding device.

SUMMARY OF THE INVENTION

According to an embodiment, an apparatus for calibrating a position finding device may have: a means for comparing a received radio signal pattern to a multitude of reference radio signal patterns, said means being configured to select a selection subset from the multitude of reference radio signal patterns by means of a measure of matching between the received radio signal pattern and one reference radio signal pattern, respectively, from the multitude of reference radio signal patterns; characterized in further comprising a means for determining signal strength difference pattern between the received radio signal pattern and one reference radio signal pattern, respectively, of the selection subset; and a means for determining a calibration offset based on the signal strength difference pattern and for providing the calibration offset to the position finding device for using the calibration offset to accordingly correct signal strengths determined by it, the received radio signal pattern includes at least one of transmitter IDs of receivable radio transmitters and signal strengths of received radio signals, and wherein the means for comparing is further configured to relate relative signal strengths for different transmitter IDs within the received radio signal pattern to corresponding relative signal strengths within the respective one of the multitude of reference radio signal patterns and to infer the measure of matching therefrom.

According to another embodiment, a position finding device for radio-based localization may have: an apparatus for calibrating as claimed in any of the previous claims; and a means for receiving radio signals that is configured to receive a calibration offset generated by the apparatus for calibrating and to scale the radio signals by means of the generated calibration offset so that any scaled radio signal data output by the means for receiving the radio signals essentially corresponds, in terms of signal strength, to reference signal data with which the radio signal data is compared.

According to another embodiment, a method of calibrating a position finding device based on radio-based localization may have the steps of: comparing a received radio signal pattern to a multitude of reference radio signal patterns; selecting reference radio signal patterns from the multitude of reference radio signal patterns into a selection subset by means of a measure of matching between the received radio signal pattern and one reference radio signal pattern, respectively, from the multitude of reference radio signal patterns; determining a signal strength difference pattern between the received radio signal pattern and one reference radio signal pattern, respectively, of the selection subset; characterized in further comprising: determining a calibration offset for the signal strength and providing the calibration offset for utilization by the position finding device to accordingly correct signal strengths determined by it, wherein the received radio signal pattern includes at least one of transmitter IDs of receivable radio transmitters and signal strengths of receivable radio signal, and that comparing the received radio signal pattern to the multitude of reference radio signal patterns relates relative signal strengths for different transmitter IDs within the received radio signal pattern to corresponding relative signal strengths within the respective one reference pattern, and infers the measure of matching therefrom.

Another embodiment may have a computer program for performing the above mentioned method, when the computer program runs on a processor or microcontroller.

In accordance with the teaching disclosed here, individual radio signals are not (only) examined separately from one another, but radio signal patterns that may be compared to reference data are generated from one or more radio signals. Generation of the radio signal patterns may be configured such that specific properties of the pattern are essentially invariant toward the above-mentioned (e.g. device-dependent) influences. Calibration in accordance with the teaching disclosed here is directed at correcting constant or at least quasi-constant influences. Thus, calibration may be put on a relatively wide database that is sufficiently scattered, e.g., temporally, spatially, with regard to a frequency of the radio signals or any other quantity, to average out random deviations and/or to be representative.

In accordance with embodiments of the present invention, an apparatus for calibrating a position finding device is provided. The apparatus for calibration includes a means for comparing a received radio signal pattern to a multitude of reference radio signal patterns, a means for determining a signal strength difference, and a means for determining a calibration value and providing it to the position finding device. The means for comparing a received radio signal pattern to a multitude of reference radio signal patterns is configured to select a selection subset from the multitude of reference radio signal patterns by means of a measure of matching between the received radio signal pattern and one reference radio signal pattern, respectively, from the multitude of reference radio signal patterns. Determination of the calibration value on the part of the means for determining the calibration value is based on the signal strength difference.

The received radio signal pattern includes at least one of a transmitter ID and a signal strength of a received radio signal. The means for comparing is further configured to relate relative signal strengths for different transmitter IDs within a received radio signal pattern to corresponding relative signal strengths within a reference radio signal pattern and to infer the measure of matching therefrom.

The selection subset captures such reference radio signal patterns that are similar, in accordance with a definition, to the received radio signal pattern. This similarity typically is mapped in a quantitative, but at least qualitative manner by the measure of matching. One may typically assume that the reference radio signal patterns included into the selection subset relate to positions that are spatially close to a current position of the position finding device, i.e. to that position where the received radio signal pattern was received. To simplify things, it may be assumed that differences between the received radio signal pattern and a (similar) reference radio signal pattern make themselves felt in that a signal level, used for localization, of the received radio signal pattern is determined to be constantly lower or higher than was the case during generation of the reference data. For example, when taking a closer look, an almost constant difference of the signal levels between two devices may often be found over the entire measurement range. In a different possible scenario, this difference may be essentially assumed to be constant at least for the period of time during which the position finding device is located inside a piece of clothing or luggage. Such quasi-constant fluctuations in the signal levels cannot be adequately taken into account by a correction value that was previously determined and fixedly programmed into the position finding device.

As was mentioned above, the received radio signal pattern includes at least one of a transmitter ID of a receivable radio transmitter and a signal strength of a received radio signal. If both the transmitter ID and the signal strength of the received radio signal are present, coarse position finding may be performed by means of the transmitter IDs received in a most recent time unit. On this basis, finer position finding may be effected in that the signal strengths of the received radio signals are evaluated in connection with the transmitter IDs that have also been received. Typically, a radio signal pattern will include a multitude of data elements, each of which contains at least one transmitter ID and one signal strength value. Accordingly, at least one reference radio signal pattern of the multitude of reference radio signal patterns may include at least one of a transmitter ID of a radio transmitter taken into account in the reference radio signal pattern and a radio signal strength of a radio signal taken into account in the reference radio signal pattern. In this manner, comparing the received radio signal strength and the reference radio signal patterns may relate, e.g., relative signal strengths for different transmitter IDs within a radio signal pattern to corresponding relative signal strengths within a reference radio signal pattern and therefrom draw conclusions regarding a possible match between the received radio signal pattern and the respective reference radio signal pattern.

In accordance with embodiments, the measure of matching may be indifferent with regard to scaling of the received radio signal pattern and the reference radio signal patterns. Thus, systematic or occasional deviations with regard to the signal strength have no or only little influence on the measure of matching, and, thus, the decision about inclusion of a specific reference radio signal pattern into the selection subset does not depend on the absolute signal strength of the received radio signal pattern and/or of the reference radio signal pattern since after all, the calibration disclosed herein is based on the assumption that at least the signal strength of the received radio signal pattern exhibits a constant or quasi-constant error.

In accordance with further embodiments, the means for comparing may be configured to compare the measure of matching to a threshold value $ACC_{Th}$. If the measure of matching between the received radio signal pattern and the specific reference radio signal pattern meets a condition defined by the threshold value $ACC_{Th}$, the received radio signal pattern and the specific reference radio signal pattern will be included, with respect to each other (e.g. as data elements of a combining data structure) into the selection subset. However, if the corresponding measure of matching does not meet the condition defined by the threshold value $ACC_{Th}$, the received radio signal pattern and the specific reference radio signal pattern will not be included into the selection subset. Since the received radio signal pattern and the specific reference radio signal pattern will be included into the selection subset if they meet the above-mentioned condition with respect to one another, it will be clear between which radio signal patterns the signal strength difference is to be determined. The threshold value $ACC_{Th}$ typically ensures that only such reference radio signal patterns are included into the selection subset which have sufficient similarity with the received radio signal pattern. Thus, one may typically prevent with sufficient reliability that calibration relies on unsuitable data.

In accordance with embodiments, the means for comparing may be configured to select, for the selection subset, such reference radio signal patterns whose measures of matching with the received radio signal pattern are within a tolerance range including a best measure-of-matching value determined up to this point. Typically, the tolerance range will be configured to be limited only unilaterally, so that a new best measure-of-matching value will in any case be taken into account. However, in accordance with this embodiment, the tolerance range also extends in the direction of poorer measure-of-matching values, starting from the best measure-of-matching value determined up to this point. In this manner, the reference radio signal patterns having the second-best, the third-best etc. match will also be included into the selection subset, so that a wider database will be available for calibration. Also, in this manner one may quite reliably prevent that a reference radio signal pattern may accidentally (e.g. noise within the radio signal in question) influence the calibration as the single reference radio signal pattern even though it would not have achieved the best measure-of-matching value if the accidental influence had not been there. It is to be noted that the best measure-of-matching value determined up to this point may be determined either continuously during the comparison of the received radio signal pattern to the multitude of reference radio signal patterns, or may already be determined in advance. In the latter case, an absolute best measure-of-matching value would serve as the best measure-of-matching value determined up to this point.

In accordance with an embodiment, the tolerance range may extend at least on one side from the best measure-of-matching value determined up to this point over a tolerance range amounting to 30% of the best measure-of-matching value determined up to this point, advantageously 10% of the best measure-of-matching value determined up to this point, and more advantageously 5% of the best measure-of-matching value determined up to this point. For example, with a tolerance range of 5% of the best measure-of-matching value determined up to this point, a relatively strict selection is made with regard to the inclusion of reference radio signal patterns into the selection subset. The selection subset will include more than one reference radio signal pattern only if the best two, three, four, or more reference radio signal patterns have measures of matching with the received radio signal pattern that are located within a narrow range, namely 5% of the best measure-of-matching value. This situation may occur, for example, when the position finding device is approximately equally spaced apart from several radio transmitters and when the propagation conditions for the radio signals are also essentially similar (or when distance and propagation conditions for different radio signals compensate one another). In such a case it may be useful to take into account for calibration all of the radio transmitters that can be received equally well instead of taking into account only that radio transmitter that can be received best.

Alternatively, the means for comparing may be configured such that it may select such reference radio signal patterns for the selection subset whose measures of matching with the received radio signal pattern are in a top, or optimum, quantile of the measures of matching for the multitude of reference radio signal patterns. For example, it might be possible to include one percent of all of those reference radio signal patterns into the selection subset which have the best measures of matching with the received reference radio signal pattern. It is also feasible for the selection subset to contain a specific number of reference radio signal patterns (e.g. five) as far as this is possible on the basis of other conditions such as the threshold value $ACC_{Th}$. Actually, it may occur that the selection subset remains empty because of the threshold value condition, whereby calibration is typically temporarily discontinued.

In accordance with embodiments, the means for comparing may be configured to select such reference radio signal patterns for the selection subset which meet the following criteria:

$$ACC_i \leq ACC_{max}$$

$$ACC_i \leq ACC_{Th} \text{ and}$$

$$ACC_{max} = ACC_0 \cdot \text{LIMIT},$$

wherein $ACC_0$ is a measure-of-matching value of a reference radio signal pattern having the currently best match, and $ACC_{Th}$ is a threshold value for the measure of matching with regard to inclusion into the selection subset. The value LIMIT may be selected to be slightly larger than 1, for example, i.e. 1.05 or 1.08, for example. The value LIMIT may be regarded as the tolerance range indicated above.

In accordance with embodiments, the means for determining and providing the calibration value may include a low-pass filter filtering at least the signal strength difference or the calibration value. Optional provision of a low-pass filter is based on the finding that the differences to be balanced off by the calibration, said differences being caused, e.g., by the existence of different types of position finding devices or by (slowly) changing environmental conditions, are either constant or change at least only rarely or slowly. In the long term, constant or slowly changeable signal components of the signal strength difference or of the calibration value will prevail at the output of the low-pass filter, whereas fast changes, which are typically due to accidental causes, will only exist in a highly attenuated state at the output of the low-pass filter.

In accordance with an embodiment, the low-pass filter may be a recursive filter having a filter input coefficient and a filter feedback coefficient. The filter feedback coefficient will typically be larger than the filter input coefficient, so that the filter output value fed back from the output of the low-pass filter has a stronger influence on the filter output signal than the filter input signal. The filter feedback coefficient may be larger than ten times, a hundred times, a thousand times or ten thousand times the filter input coefficient. If the filter feedback coefficient is indicated by the parameter a, the filter input coefficient may be indicated, e.g., in dependence on the filter feedback coefficient, e.g. filter input coefficient=1/(a+1). An exemplary value of a=500 thus results in a ratio of 25,500 between the filter feedback coefficient and the filter input coefficient. The value of the parameter a may be set in dependence on a currently set sampling rate (polling interval).

In accordance with an embodiment, the low-pass filter may be configured to determine a filtered signal strength difference from a multitude of individual signal strength differences. The multitude of individual signal strength differences may correspond to signal strength differences that within a reference radio signal pattern among the multitude of reference radio signal patterns relate to radio transmitters taken into account in the reference radio signal pattern. In addition, the multitude of individual signal strength differences may serve as input quantities for the low-pass filter. The individual signal strength differences may thus be directly used further, since any systematic deviations that might arise are likely to have an impact on all of the individual signal strength differences anyway.

One aspect of the technical teaching disclosed herein relates to a position finding device for radio-based localization which includes an apparatus for calibrating as was described above and a means for receiving radio signals. The means for receiving the radio signals is configured to receive a calibration value generated by the apparatus for calibrating and to scale the radio signals by means of the generated calibration value so that any scaled radio signal data output by the means for receiving the radio signals essentially corresponds, in terms of signal strength, to reference signal data with which the radio signal data is compared (by means of further functional units of the position finding device). Thus, the position finding device is capable of calibrating itself at regular intervals or continuously. The ability to (self-)calibrate may ensure continued reliable position finding in particular in such situations where the position finding device is located in areas with low radio transmitter coverage. To be precise, in such areas, determining the signal strength of the radio signals of the receivable radio transmitters plays a relatively important part in position finding.

In accordance with an embodiment, the mode of operation of the position finding device is based on a fingerprinting principle. Using the fingerprinting principle, relatively accurate position finding may be performed, in particular if, in addition to the transmitter IDs of the radio transmitters receivable by the position finding device, relatively accurate data with regard to the signal strengths of the radio signals radiated by the radio transmitters may also be determined.

The technical teaching disclosed relates to a method of calibrating a position finding device based on radio-based localization, comprising:
comparing a received radio signal pattern to a multitude of reference radio signal patterns;
selecting reference radio signal patterns from the multitude of reference radio signal patterns into a selection subset by means of a measure of matching between the received radio signal pattern and one reference radio signal pattern, respectively, from the multitude of reference radio signal patterns;
determining a signal strength difference between the received radio signal pattern and one reference radio signal pattern, respectively, of the selection subset; and
determining a calibration value for the signal strength and providing the calibration value for utilization by the position finding device.

The technical teaching disclosed herein also relates to a computer program for performing the method mentioned, when the computer program runs on a processor or microcontroller.

Both the method of calibrating and the computer program may be specified in more detail by previously mentioned technical features related to the apparatus for calibrating.

BRIEF DESCRIPTION OF THE DRAWINGS

Embodiments of the present invention will be explained below in more detail with reference to the accompanying figures, wherein.

DETAILED DESCRIPTION OF THE INVENTION

Figure 1:
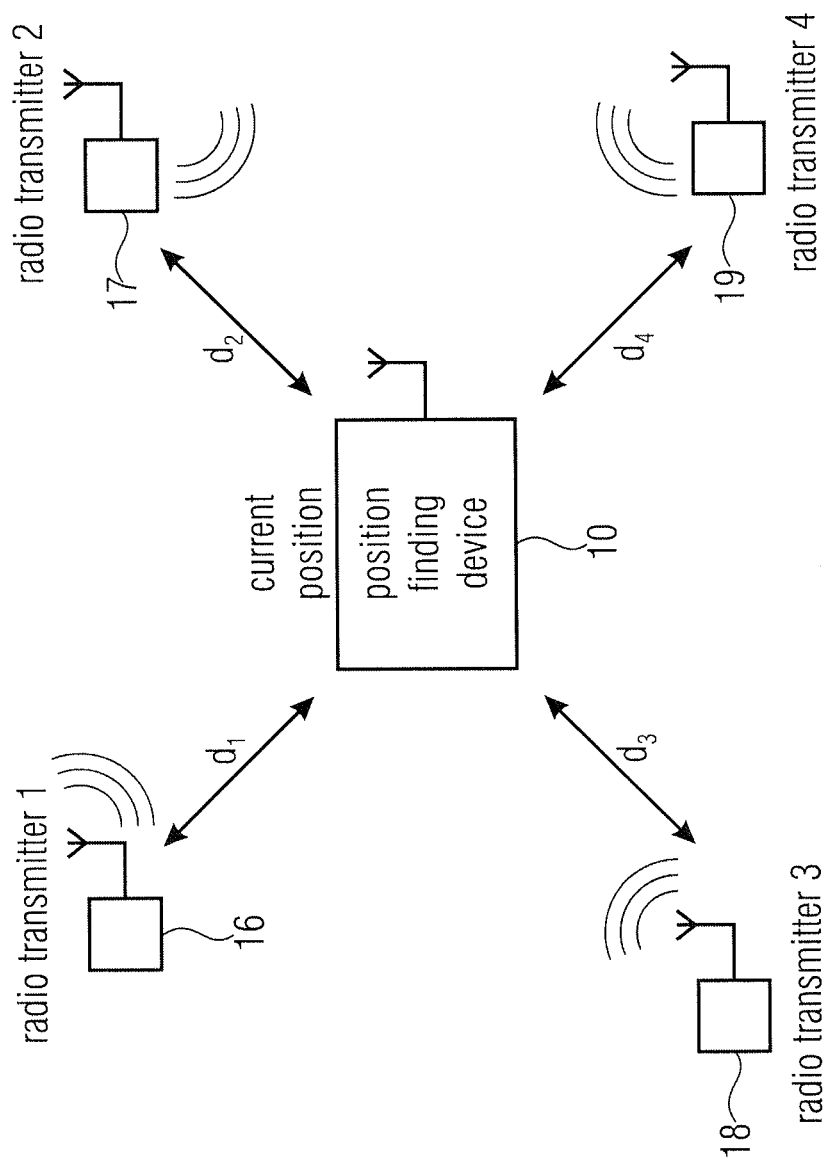
FIG. 1 shows a schematic representation for understanding the mode of operation of a radio-based localization system.

FIG. 1 is to illustrate the basic principle of radio-based localization. At a given point in time, a position finding device 10 is located at a current position to be found. The position finding device 10 is located within the range of four radio transmitters 16, 17, 18, and 19, so that the position finding device 10 may receive radio signals from the radio transmitters 16 to 19. The distance between the position finding device 10 and the radio transmitters 16 to 19 is $d_1$, $d_2$, $d_3$, and $d_4$, respectively. However, said distances are not known in advance to the position finding device.

Coarse position finding may be performed already because of the fact that the position finding device 10 is located within the ranges of the radio transmitters 16 to 19. To this end, each of the radio transmitters 16 to 19 marks the radio signals it sends out with a transmitter ID. For more accurate position finding, use may be made of the fact that radio signals weaken as a function of the distance. A distance between the radio transmitter in question and the current position of the position finding device 10 may be estimated on the basis of the signal strength and/or signal level existing at the current position. On the basis of this information, the position may be determined by means of interpolation, for example.

A possible implementation of radio-based localization is the so-called fingerprinting method. In accordance with the fingerprinting principle, the radio signals received at the current position from the radio transmitters 16 to 19 are compared to a multitude of reference points that were captured previously. That reference point for which selected properties (radio transmitter identification and possibly signal strength) of the received radio signals are most similar will be selected for further processing. It may be assumed that the position finding device 10 is located in the spatial vicinity of the position where the reference point was captured and is therefore known.

Figure 2:
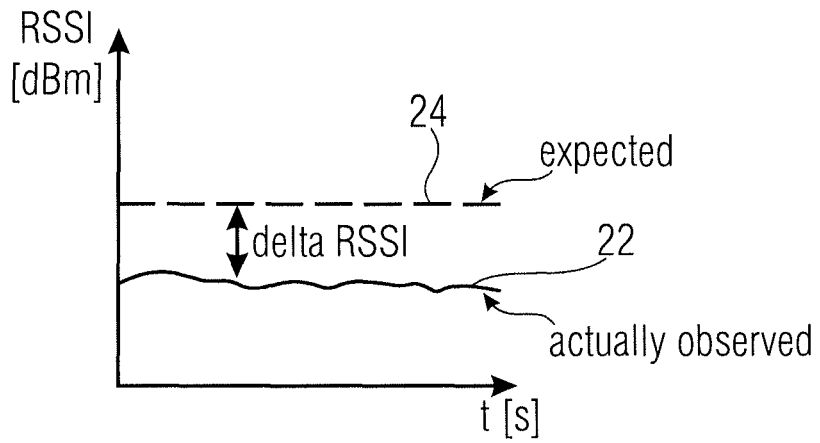
FIG. 2 shows exemplary signal strengths in dependence on time in a current position of a position finding device.

By way of example, FIG. 2 shows a temporal curve of an actually observed signal strength 22. The actually observed signal strength 22 relates to a radio signal of a radio transmitter i, specifically such as was determined at the current position of a given position finding device 10. The signal strength is plotted on the ordinate of the graph shown in FIG. 2 and is indicated by RSSI (received signal strength indicator). The actually observed signal strength 22 is essentially constant and varies only slightly about a long-term average.

A temporal curve of an expected signal strength 24 is also plotted as a dashed line in FIG. 2. The expected signal strength 24 was determined, for example, during a training phase of the radio-based localization system. The position finding device used during the training phase may be different to that used during a utilization phase. This difference explains that the expected signal strength 24 deviates from the actually observed signal strength 22. However, the deviation deltaRSSI is essentially constant over time. Without any further steps being taken, the position finding device 10 cannot establish which proportion in the deviation deltaRSSI falls to the distance between the radio transmitter 16 and the position finding device 10, and which proportion falls to systematic deviation, e.g. due to utilization of antennas of different qualities during the training phase, on the one hand, and the later utilization phase, on the other hand.

Figure 3:
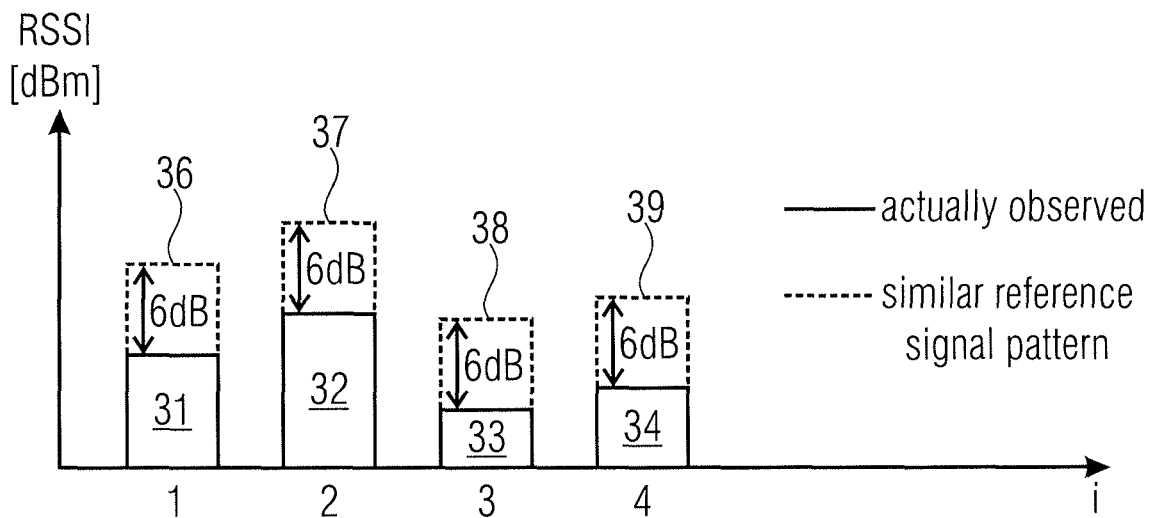
FIG. 3 shows a graphic representation of a measured radio signal pattern and a similar reference radio signal pattern.

FIG. 3 shows the signal strengths 31, 32, 33, and 34, which are actually observed at the current position by the position finding device 10, in dependence on an index i indicating the radio transmitter in question. The signal strengths plotted in dependence on the respective radio transmitter and/or on a transmitter ID provided by the radio transmitter may be regarded as an example of what a radio signal pattern may be like. FIG. 3 also shows a similar reference signal pattern resulting in an analogous manner from the reference signal strengths 36, 37, 38, and 39. The similar reference signal pattern is depicted as a dashed line. The similarity between the received radio signal pattern and the similar reference signal pattern in the example shown in FIG. 3 results from the fact that the difference of the signal strengths is 6 dB in each case. Therefore, e.g. the scattering of the signal strength difference over the index i for the radio transmitters may be indicated as the measure of matching. Since in practical applications of the position finding device, there will typically be a large number of reference radio signal patterns, calibration is about making a selection, from the quantity of those reference radio signal patterns that are similar, as defined by the measure of matching, to the received radio signal pattern. This selection should be indifferent to absolute signal strengths of the received radio signal pattern, i.e. it is typically irrelevant whether the deviation as depicted in FIG. 3 is constantly 6 dB or whether the deviation is constantly 8 dB. Typically, the only thing that matters is that the deviation is essentially the same for all of the radio transmitters i, i.e. has a small amount of scattering.

Figure 4:
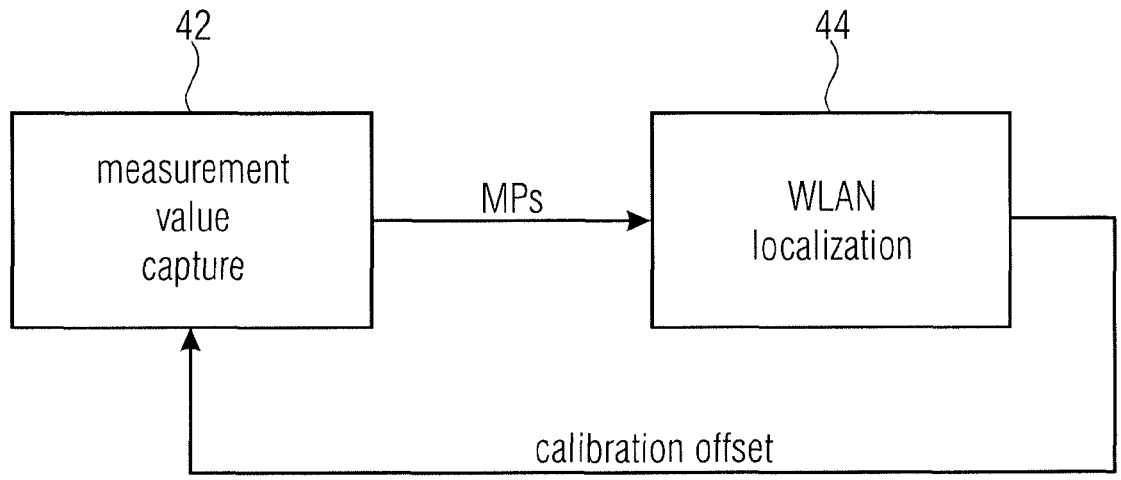
FIG. 4 shows an overview block diagram of elements of a position finding device that is connected to calibration in accordance with the technical teaching disclosed herein.

FIG. 4 shows how the calibration within the position finding device 10 may be used. A position finding device 10 operating in accordance with the fingerprinting principle typically includes a measurement value capture 42, which, among other things, performs the function of a radio signal receiver. Thus, received radio signals are suitably processed (amplification, demodulation, etc.). In addition, the measurement value capture 42 also determines the signal strength of the radio signals received. The measurement value capture 42 outputs so-called measurement packs (MPs), which continue to be used by a WLAN localization module 44. The WLAN localization module 44 typically matches the received transmitter IDs with a database, and by means of the signal strengths provided by the measurement value capture 42 it determines a position of the position finding device. In the block diagram depicted in FIG. 4, the apparatus for calibrating is integrated into the WLAN localization module 44. Thus, the WLAN localization module 44 provides a calibration deviation (calibration offset), which will be returned to the measurement value capture 42. The measurement value capture 42 uses the calibration offset to accordingly correct the signal strengths determined by it, which typically also has a favorable effect on the function of the measurement value capture 42.

Figure 5:
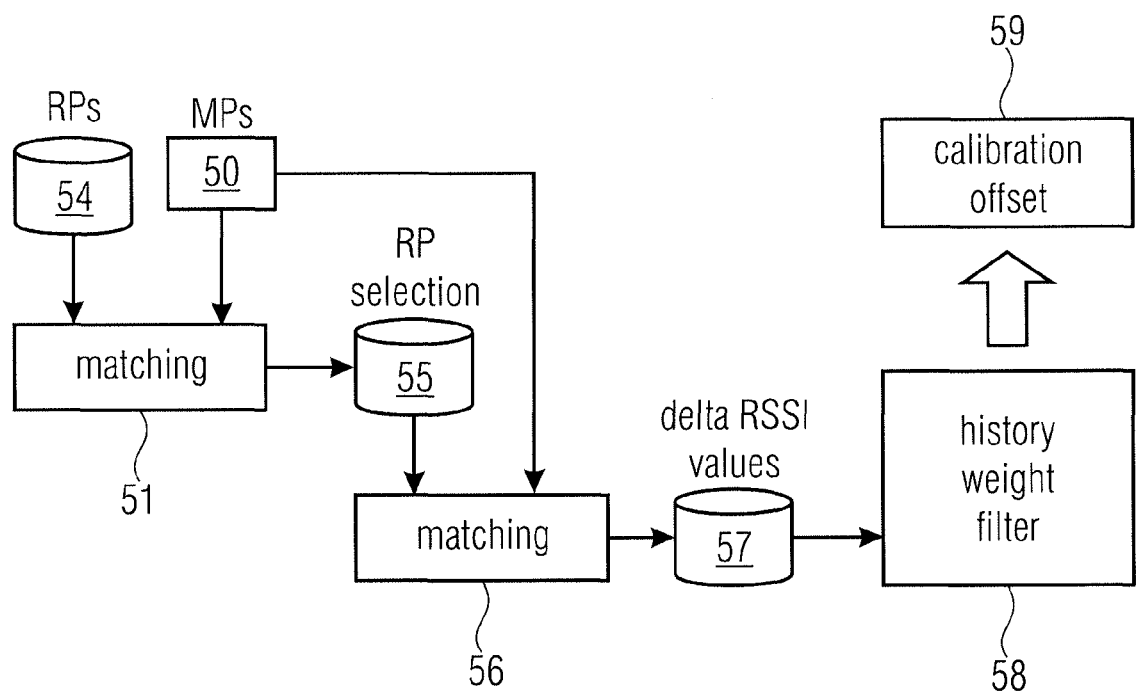
FIG. 5 shows a schematic block diagram of an embodiment of the technical teaching disclosed.

FIG. 5 shows a schematic block diagram of an apparatus for calibrating in accordance with the disclosed teaching. The apparatus for calibrating obtains, e.g., a measurement pack 50 from the measurement value capture 42 or, alternatively, the apparatus for calibrating may be configured to autonomously determine the measurement pack 50. The apparatus for calibrating also has access to a storage means or database containing reference packs 54 (RPs). The measurement pack 50 received, which reflects a recently received radio signal pattern, and the reference packs 54 are supplied to a means for comparing 51. The means for comparing 51 typically has the task of comparing the multitude of reference packs 54 to the received measurement pack 50, differences between the reference packs 54 and the received measurement pack 50 that are due to systematic, constant, or quasi-constant offsets typically (and as far as implementable) not being taken into account by the means for comparing 51. As an output, the apparatus for comparing 51 provides a reference pack selection 55 wherein such reference packs are taken into account which are similar—independent of the above-mentioned systematic, constant, or quasi-constant offsets—to the received radio signal pattern in the received measurement pack 50. Such a similarity may typically be interpreted to mean that the reference radio signal patterns contained in the selected reference packs of the reference pack selection 55 have been captured at positions that are located in spatial vicinity of the current position to which the received radio signal pattern of the received measurement pack 50 relates.

Once the reference pack selection 55 is complete, it is supplied to a means for determining a signal strength difference 56 (matching). The means for determining the signal strength difference 56 also includes an input for the current measurement pack 50. The means for determining the signal strength difference 56 typically determines a signal strength difference per reference pack in the reference pack selection 55. The signal strength differences determined (deltaRSSI values) are stored in a data structure or a database 57. From there, they are supplied to a history weight filter 58. Thus, one may achieve that such deviations which on a statistical average occur in a large number of pairs of reference packs 54 and measurement packs 50 will prevail between the reference packs and the received measurement packs. The history weight filter 58 outputs a calibration value 59 (calibration offset) that is fed back to the measurement value capture 42 (FIG. 4).

Figure 6:
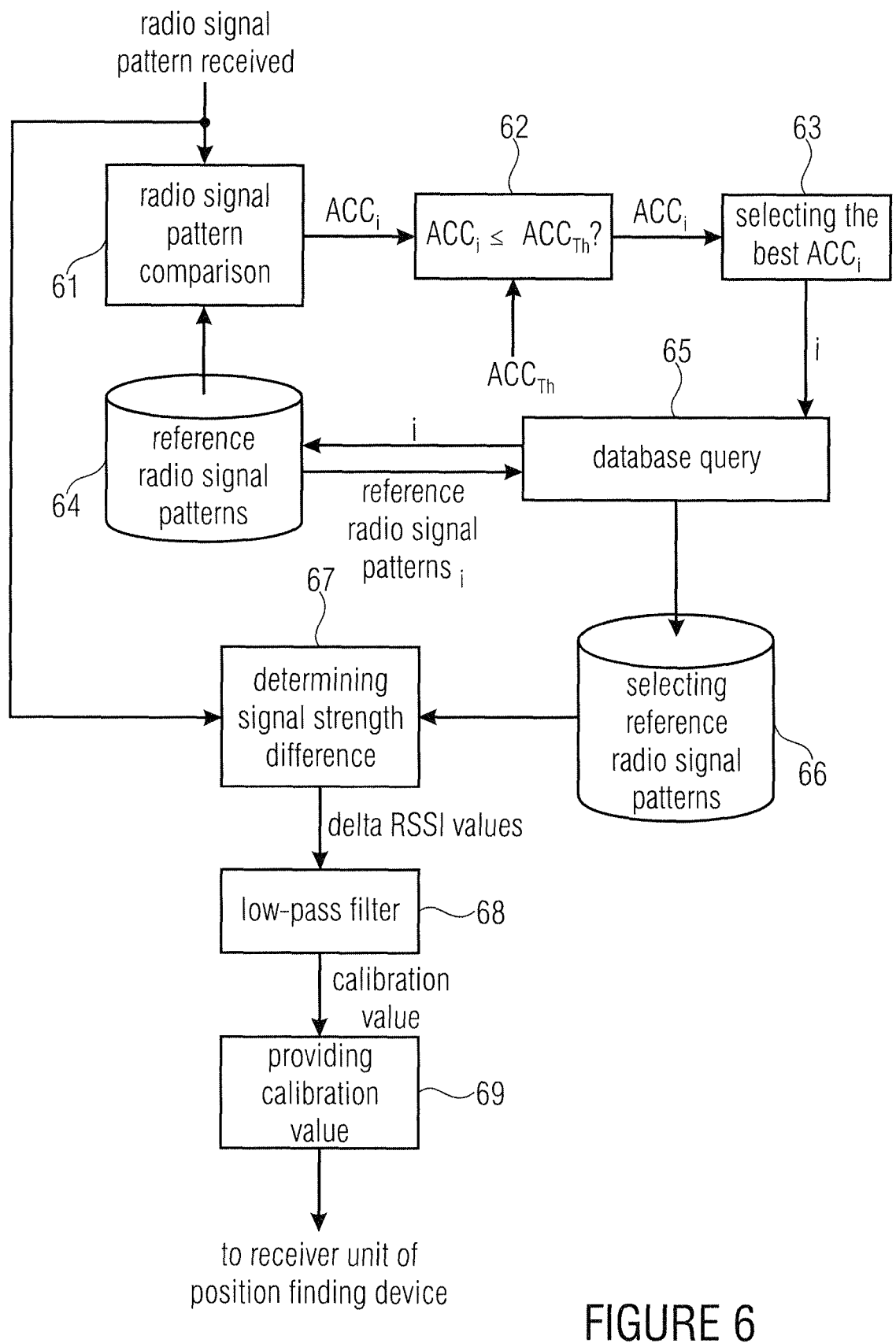
FIG. 6 shows a schematic block diagram of a further embodiment of an apparatus for calibrating in accordance with the technical teaching disclosed.

FIG. 6 shows a slightly more detailed, schematic block diagram of an apparatus for calibrating in accordance with an embodiment of the teaching disclosed. A received radio signal pattern is supplied to a means for a radio signal pattern comparison 61. A reference radio signal pattern from a multitude of reference radio signal patterns 64 serves as a further input quantity for the means for a radio signal pattern comparison 61 in each case. It is to be noted that a specific received radio signal pattern is typically compared to a multitude of or even all of the reference radio signal patterns 64 by the means 61. To limit the computing expenditure necessitated for the radio signal pattern comparison and to limit the respective time necessitated, a reasonable pre-selection may be made among the multitude of reference radio signal patterns 64, for example on the basis of the positions determined most recently, since a spatial proximity between the positions determined most recently and the current position is likely. The means for a radio signal pattern comparison 61 outputs one measure of matching $ACC_i$ each for one comparative pair (received radio signal pattern as against a reference radio signal pattern). The measure of matching $ACC_i$ determined is initially compared to an absolute threshold value $ACC_{Th}$ by a function block 62. If the measure of matching $ACC_i$ determined is larger than the absolute threshold value $ACC_{Th}$, there will be no sufficient match between the received radio signal pattern and the reference radio signal pattern. This comparative pair will thus be discarded. However, if the measure of matching meets the condition $ACC_i \leq ACC_{Th}$, the measure of matching $ACC_i$ will be forwarded to a selection functional block 63, which will determine the best value of the measure of matching $ACC_i$, or a quantity of the best measure-of-matching values. In the case depicted in FIG. 6, small values of the measure of matching $ACC_i$ correspond to high matches between the received radio signal pattern and the respective reference radio signal pattern, whereas high values of the measure of matching $ACC_i$ reflect poorer matches. Eventually, this is a question of defining the measure of matching and has no fundamental effects on the teaching disclosed. The abbreviation ACC used for the measure of matching results from the English word "accuracy". Depending on the implementation and configuration, the selection functional block 63 outputs an index or several indices relating to that, or those, reference radio signal pattern(s) that best match(es) the received radio signal pattern. The index i or the indices i are forwarded to a database query 65, which uses them for querying the database with the reference radio signal pattern 64. Subsequently, the database 64 returns the corresponding reference radio signal patterns, and the means for database query 65 inserts them into a data structure or further database 66, which contains a selection of the reference radio signal patterns.

FIG. 6 describes a successive selection of the reference radio signal patterns wherein the reference radio signal pattern that currently has the best measure of matching may constantly change. Alternatively, it is also feasible that, for each measurement pack (MP) determined by the position finding device, the measures of matching for all (or at least some) of the reference radio signal patterns present in the database 64 are determined in one pass. Subsequently, the reference radio signal patterns are evaluated in accordance with their measures of matching, so that the best-matching reference radio signal pattern(s) may be determined.

Both the received radio signal pattern and the reference radio signal patterns contained in the selection of the reference radio signal patterns 66 are used as input quantities for a means for determining the signal strength difference 67. As was already mentioned in connection with FIG. 5, one signal strength difference is determined for each comparative pair consisting of the received radio signal pattern and a reference radio signal pattern of the selection 66. Thus, the means for determining the signal strength difference 67 outputs a multitude of signal strength difference values (deltaRSSI values). The signal strength differences output are supplied to a low-pass filter 68 in that order in which they are calculated. The low-pass filter 68 determines a calibration value which all in all corresponds to a constant deviation that one was able to be establish in a large number of comparative pairs between the received radio signal pattern and the selected reference radio signal patterns. The calibration value is then captured by a means for providing the calibration value 69, from where it is made available to the receiver unit of the position finding device, or may be recalled by same.

The measure of matching ACC may be determined in the following manner described in the German disclosure document DE 10 2008 036 681 A1. The radio signals and/or the radio transmitters associated with the radio signals may be separated, or filtered, into a first number $N_{eq}$ of radio transmitters, of which previously recorded transmitter IDs at the reference position are identical with transmitter IDs provided at the current position, and into a second number $N_{neq}$ of radio transmitters, of which previously recorded transmitter IDs at the reference position and transmitter IDs provided at the position are different, i.e. into a number $N_{neq}$ of radio transmitters whose transmitter IDs are provided either only at the current position and were not previously recorded at the reference position, or whose transmitter IDs were previously recorded only at the reference position and are not provided at the current position. There may be a sub-step of selecting, from the second number $N_{neq}$ of radio transmitters, a number $N_{nh}$ ("not heard") of radio transmitters that were not received at the current position, i.e. of radio transmitters of which previously recorded properties are present at the reference position but of which none of the properties provided at the current position is present. The higher the number $N_{nh}$ of the radio transmitters not received at the current position, the more likely it will be that the current position does not correspond to the reference position. In addition, a further substep may be provided which comprises selecting, from the second number $N_{neq}$ of radio transmitters, a number $N_{htm}$ ("heard too much") of the radio transmitters received in excess at the current position, of which no previously recorded electromagnetic properties are present at the reference position, but of which electromagnetic properties provided at the current position are present. The higher the number $N_{htm}$ of the radio transmitters received in excess at the current position, the more likely it will be that the current position does not correspond to the reference position. Therefore, the second number $N_{neq}$ of radio transmitters results from the number $N_{nh}$ of radio transmitters not received at the current position and from the number $N_{htm}$ of radio transmitters received in excess at the current position, in accordance with $N_{neq} = (N_{nh} + N_{htm})$.

On the basis of the provided properties of the radio signals, a third step comprises determining the measure of matching and/or a distance value ACC for the current position, wherein both properties of the first number $N_{eq}$ of radio transmitters and properties of the second number $N_{neq}$ of radio transmitters are taken into account for determining the measure of matching, and wherein the properties of the first number $N_{eq}$ of the radio transmitters and the properties of the second number $N_{neq}$ of the radio transmitters are reflected to different degrees in the measure of matching. In accordance with embodiments, the properties of the first number $N_{eq}$ of the radio transmitters are given more weight than the properties of the second number $N_{neq}$ of the radio transmitters, which will be addressed in more detail below.

The step of determining and/or providing the properties of radio signals is performed by a mobile terminal, or client, such as a WLAN-capable PDA, a Bluetooth-capable PDA, or even a mobile phone, for example. To this end, the client has a means for determining and/or providing the properties of the radio signals of the fixedly positioned radio transmitters, the properties generally being characterized by an ID of a fixedly positioned radio transmitter and its electromagnetic signal characteristic, such as a reception field strength, a receive spectrum, or a received signal-to-noise ratio.

The ID, or an identifying feature, of a fixedly positioned radio transmitter may be an MAC (media access control) address, a base station ID or a cell ID.

The properties of the radio signals may be understood to mean the previously described measurement packs MP(i). The properties MP(i) that have been determined and/or provided are provided to a means 34 for separating the radio signals and/or their associated radio transmitters into a first number $N_{eq}$ of radio transmitters and a second number $N_{neq}$ of radio transmitters. The first number $N_{eq}$ of radio transmitters includes those radio transmitters of which previously recorded transmitter IDs at the reference position observed are identical with transmitter IDs determined at the current position. The second number $N_{neq}=(N_{nh}+N_{htm})$ of radio transmitters includes those radio transmitters whose transmitter IDs are provided either only at the position and were not previously recorded at the reference position, or whose transmitter IDs were previously recorded only at the reference position and are not provided at the position. Thus, the radio signals are divided up into at least two groups. A first group includes properties of radio signals of the first number $N_{eq}$ of radio transmitters, whereas a second group includes properties of radio signals of the second number $N_{neq}$ of radio transmitters. As was already described above, the second group may also be subdivided into a group of properties of radio signals of radio transmitters not received at the current position and into a group of properties of radio signals of radio transmitters received in excess at the position. The properties of the first number $N_{eq}$ of radio transmitters and the properties of the second number $N_{neq}$ of radio transmitters may be reflected to different degrees in the measure of matching, i.e. may be weighted differently.

As far as they are receivable, signals of several base stations and/or radio transmitters are provided with different signal strengths at each location or position along with the associated transmitter IDs. In the case of WLAN networks, such an electronic fingerprint includes a list of MAC addresses that are unambiguous for each WLAN device or WLAN radio transmitter, and of the associated received signal strengths, and thus characterizes the current position. It does not matter where the WLAN radio transmitters are positioned.

Differences are now formed between the previously recorded electromagnetic properties at the reference position and the electromagnetic properties, provided at the current position, of the first number $N_{eq}$ of radio transmitters. For example, differences are formed of RSSI values of radio transmitters of which previously recorded transmitter IDs at the reference position are identical with transmitter IDs provided at the current position. These RSSI difference values $\Delta RSSI_1$ to $\Delta RSSI_{Neq}$ are summed up to yield a sum $\Sigma \Delta RSSI_n$. $N_{eq}$ is the first number of radio transmitters occurring both in the measurement pack and in the reference pack. The function $\Delta RSSI$ calculates a distance between two signal strength values. As the distance function, one may select, for example, the Euclidean distance of the measurement values in dB. In this context, distance therefore does not mean a spatial distance, but a mathematical deviation. Following the summation, the sum $\Sigma \Delta RSSI_n$ is weighted with a weighting factor EQW, i.e. $EQW \cdot \Sigma \Delta RSSI_n$. EQW defines a weight between 0 and 1 which indicates the degree to which the distance of the measurement values and/or the distance of the signal strength values $\Sigma \Delta RSSI_n$ is to be evaluated as compared to the radio transmitters that are heard in excess or not heard at the current position.

If one were to stop calculating the measure of matching at this point, it would be possible that such reference positions might be selected as candidates that actually have a poorer match with the current position than such having a better match. One example of this: Let's assume that for a first reference point a comparison with the current position yields $N_{eq}=1$, i.e. between the reference measurement pack and the current measurement pack, there is a match of only one radio transmitter ID. If the corresponding RSSI values of the measure of measurement packs are accidentally apart by 2.5 dB, for example, $\Sigma \Delta RSSI_1/N_{eq}=2.5$ dB will result. Let us further assume that for a second reference point, a comparison with the current position yields $N_{eq}=3$, i.e. between the reference measurement pack and the current measurement pack, there is a match of three radio transmitter IDs. If the corresponding RSSI values are apart by 2 dB, 3 dB, and 4 dB, for example, $\Sigma \Delta RSSI_n/N_{eq}=3$ dB will result overall. Consequently, the second reference point would be given a poorer evaluation than the first one, which would lead to an estimation error. By means of the previously described scheme, such estimation errors may be avoided or at least reduced.

For each of the radio transmitters not received, a malus function and/or a malus value $M_{nh,m}()$ (m=1, ..., $N_{nh}$) may be defined. This means that for each station present in the reference values but not in the current measurement values, a malus value $M_{nh,m()\ (m=}1, \ldots, N_{nh})$ may be defined. Said malus value may depend, e.g., on the level of reliability with which the station that, accordingly, was not received, was receivable at the reference position in the past. In case of high receivability, up to this point, of the station not received, i.e. in case of a high RSSI value, a high malus value will result, for example. Thus, the malus value $M_{nh,m}()$ (m=1, ..., $N_{nh}$) may be directly proportional to the reference RSSI value of that station that is not received at the current position. In addition, the malus function $M_{nh,m}()$ (m=1, ..., $N_{nh}$) may be linked to a PGS value of the corresponding, not received radio transmitter. A small PGS value in the reference data basis may only result in a small value of the corresponding malus function $M_{nh,m}()$ for example. This may also be calculated by the following formula:

$$M_{nh,m}(PGS) = \text{FixMalus} + \text{DynamicMalus},$$

wherein DynamicMalus=FixMalus*PGS/100. The function $M_{nh,m}()$ (m=1, ..., $N_{nh}$) for a malus value of a radio transmitter not received is therefore dependent, in accordance with embodiments, on a property that is related to a reception field strength and was previously recorded at the reference point, and on models, e.g. for the surroundings, of the quality of the measurement values, etc. The $N_{nh}$ malus values $M_{nh,m}()$ (m=1, ..., $N_{nh}$) for the radio transmitters that are not received at the current position are processed further to determine a first sum $\Sigma M_{nh,m}()$ of the $N_{nh}$ malus values of the radio transmitters not received.

Properties of radio signals of a number $N_{htm}$ of radio transmitters received in excess at the current position are associated with radio transmitters of which no previously recorded electromagnetic properties are present at the reference position, but of which electromagnetic properties provided at the current position are present. Each of the radio transmitters received in excess at the current position may have a malus function $M_{htm,r}()$ ($r=1, \ldots, N_{htm}$) or a malus value associated with it. This means that for each radio transmitter which is missing in the reference values but is contained in the currently measured measurement values, a malus value $M_{htm,r}()$ ($r=1, \ldots, N_{htm}$) may be defined. In this context, too, the function for the malus value $M_{htm,r}()$ ($r=1, \ldots, N_{htm}$) may be dependent on the current RSSI measurement value of the radio transmitter and on models, for example for the surroundings, the quality of the measurement values, the age of the reference data, etc. A radio transmitter received in excess at the current position may have a malus value $M_{htm,r}()$ ($r=1, \ldots, N_{htm}$) associated with it depending on a property related to the reception field strength of a radio signal, for example on the RSSI value. Thus, the malus value $M_{htm,r}()$ ($r=1, \ldots, N_{htm}$) as a rule is directly proportional to the reference RSSI value of the station received in excess at the current position. In addition, the malus function $M_{htm,r}()$ ($r=1, \ldots, N_{htm}$) may be linked to a PGS value of the corresponding radio transmitter received in excess. A small PGS value in the reference data basis, for example, may only result in a small value of the corresponding malus function $M_{htm,r}()$ ($r=1, \ldots, N_{htm}$). The $N_{htm}$ malus values of the radio transmitters received in excess are summed up into a second sum $\Sigma M_{htm,r}()$.

The first sum $\Sigma M_{nh,m}()$ of the malus values of the radio transmitters not received and the second sum $\Sigma M_{htm,r}()$ of the radio transmitters received in excess are summed up in accordance with embodiments and are weighted using a weighting factor $(1-EQW)$, i.e. $(1-EQW)\cdot(\Sigma M_{nh,m}()+\Sigma M_{htm,r}())$.

Finally, the weighted sum $EQW \cdot \Sigma \Delta RSSI_n$ of the differences between previously recorded electromagnetic properties at the reference position and the electromagnetic properties, provided at the position, of the first number $N_{eq}$ of radio transmitters and the weighted sum $(1-EQW)\cdot(\Sigma M_{nh,m}()+\Sigma M_{htm,r}())$ of the malus values are summed up and normalized with $(N_{eq}+N_{nh}+N_{htm})$ in order to obtain the distance value ACC between the current position and the reference position contemplated. For example, the distance value ACC may be calculated in accordance with $$ACC = \frac{EQW \cdot \sum_{n=1}^{N_{eq}} \Delta RSSI_n() + (1-EQW) \cdot \left( \sum_{m=1}^{N_{nh}} M_{nh,m}() + \sum_{r=1}^{N_{HTM}} M_{htm,r}() \right)}{N_{eq}+N_{nh}+N_{htm}}. \quad (1)$$

If the distance value ACC is determined in accordance with equation (1), a match between the current position and the reference position contemplated will be the larger, the smaller the distance value ACC. This means the smaller the sum $\Sigma \Delta RSSI_n$ of the differences, and the smaller the sums $\Sigma M_{nh,m}()$, $\Sigma M_{htm,r}()$ of the malus values, the larger the match will be.

In accordance with other embodiments, the measure of matching might also be inverse to the distance value ACC, or it might be calculated in accordance with $(1-ACC)$ if ACC cannot become larger than 1. I.e., the smaller the distance ACC, the larger the measure of matching. Of course, other calculation specifications are also feasible wherein the properties of the first number $N_{eq}$ of radio transmitters and the properties of the second number $N_{neq}=(N_{nh}+N_{htm})$ of radio transmitters are reflected to different degrees in the measure of matching.

In accordance with the above-described calculation method for the distance value ACC, each station received in excess or not received increases the distance ACC. The treatment of different stations in the fingerprint and in current measurement values strongly influences accuracy: a station that is missing in the stored reference fingerprint, but comes up in the current measurement is a strong indication that this fingerprint is not a match.

Figure 7:
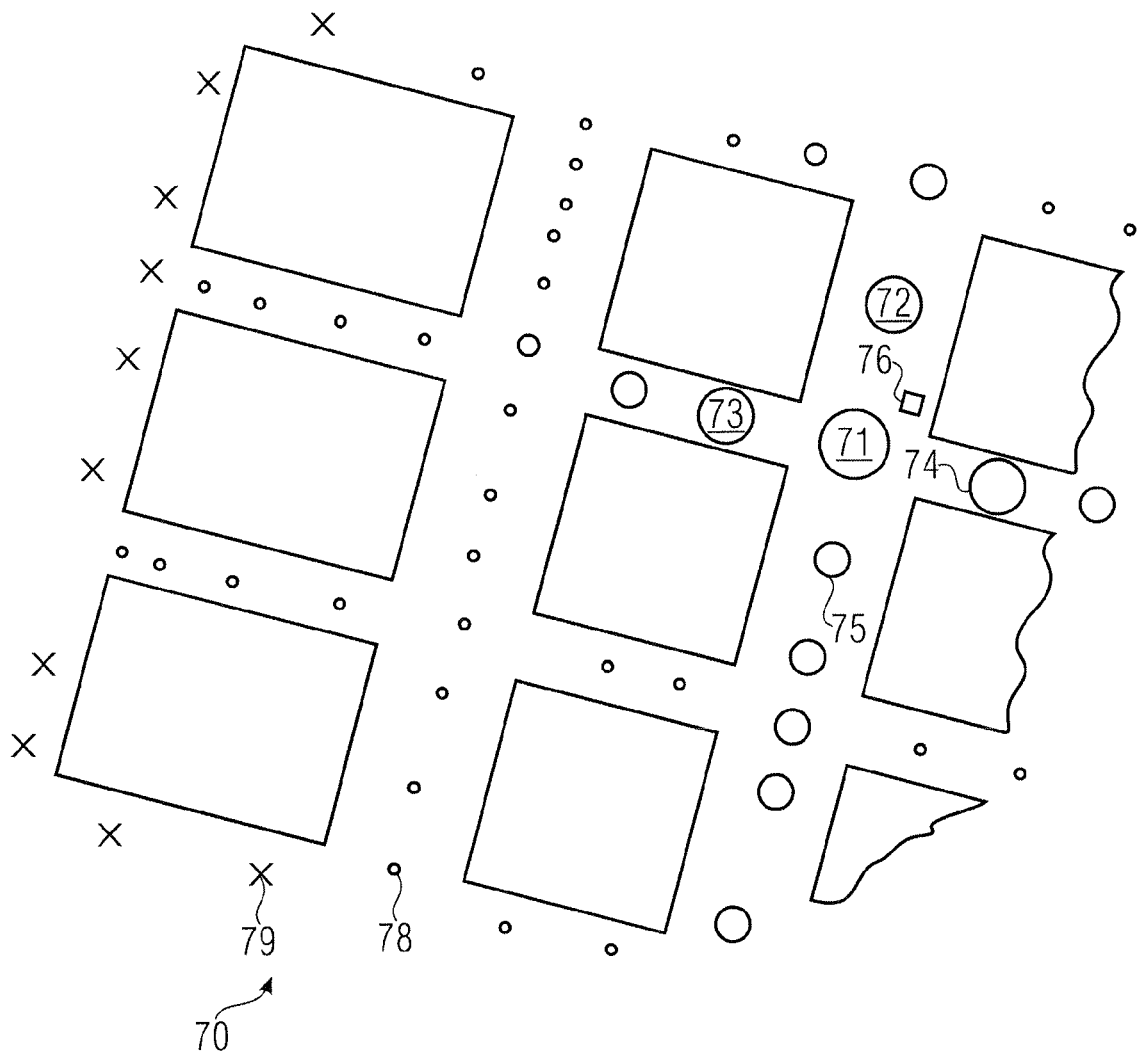
FIG. 7 shows a top view of a geographic area wherein position finding may be performed.

FIG. 7 shows a ground plan of a geographic area 70 such as a part of a town or a trade-fair hall having trade-fair stands and aisles between them. The position finding device 10 is located at a current position 76. For a multitude of positions within the geographic area 70, reference data sets have been recorded, which are depicted either as a circle or as a cross in FIG. 7. The reference positions 79 depicted as a cross are too far away from the current position 76 of the position finding device 10, so that there is no match (or only a small match) for the radio transmitters receivable at these two positions. At the reference positions 78 depicted as a circle, at least a basic match is given between the radio signal pattern received at the current position 76 and the reference radio signal pattern recorded for the respective reference position. Such a basic match may be due to there being a sufficient match at the radio transmitters receivable at both positions. In addition, FIG. 7 also depicts the measure of matching between the receivable radio signal pattern at the current position 76 and the reference radio signal patterns at the respective reference positions. A small circle at the respective reference position indicates that there is only a small match. However, a large circle indicates that there is a high match.

The reference positions 71, 72, 73, 74, and 75 located in the vicinity of the current position 76 correspond to relatively good matches between the received radio signal pattern and the respective reference radio signal patterns. The reference position 71 represents the reference position having the best match. The reference positions 72 to 75 exhibit sufficient matches between the received radio signal pattern and the respective reference radio signal patterns, so that they may also be used for calibration purposes. Thus, the reference radio signal patterns that correspond to the reference positions 71 to 75 are taken into account in the selection of the reference radio signal patterns 57 and 66, respectively (FIGS. 5 and 6). Even if the signal strength of the received radio signal pattern at the current position 76 should deviate considerably—due to a lack of calibration or to poor calibration, in absolute values—from the signal strengths determined for the reference positions 71 to 75, the means for comparing 51, 61, may ensure that such reference positions are used for calibration which are in spatial proximity to the current position 76.

Figure 8:
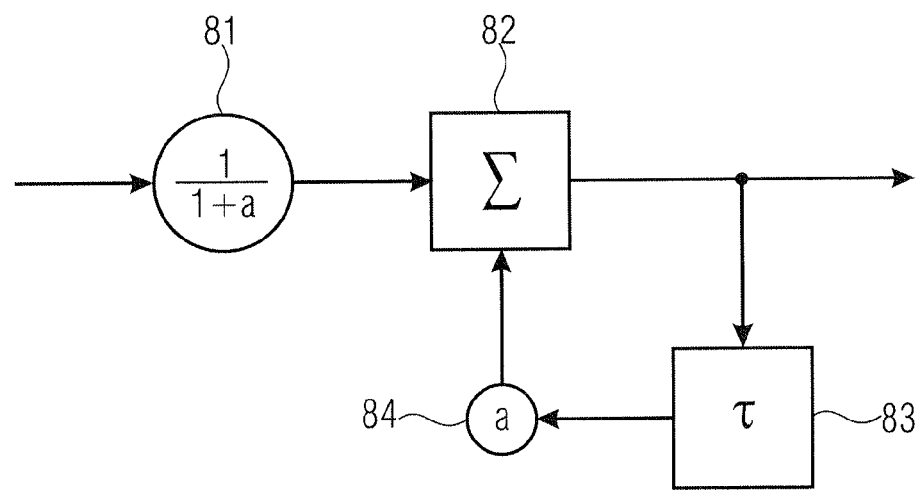
FIG. 8 shows a schematic block diagram of a recursive low-pass filter.

FIG. 8 shows a schematic block diagram of an embodiment of a low-pass filter as may be used, e.g., for the history weight filter 58 or the low-pass filter 68. The filter shown in FIG. 8 is a recursive filter which initially filters out a filter input quantity using a filter input coefficient 81. The filter input coefficient 81 here is expressed as a function of a parameter a, specifically as $1/(1+a)$. The filter input quantity multiplied by the filter input coefficient 81 is supplied to an adder 82. The adder 82 has a further input, via which a previous filter output value is supplied to the adder 82. The previous filter output value is tapped at the output of the adder 82, supplied to a delay element 83, and then multiplied by a filter feedback coefficient 84, which in the case depicted in FIG. 8 equals the parameter a. Thus, the filter output at the time k may be expressed as follows:

$$y[k]=(1/(1+a))\cdot x[k]+a\cdot y[k-1].$$

The parameter a is typically selected to be relatively large, e.g. a=500. The value of the parameter a may be rendered dependent on a currently set sampling rate (polling interval).

Figure 9:
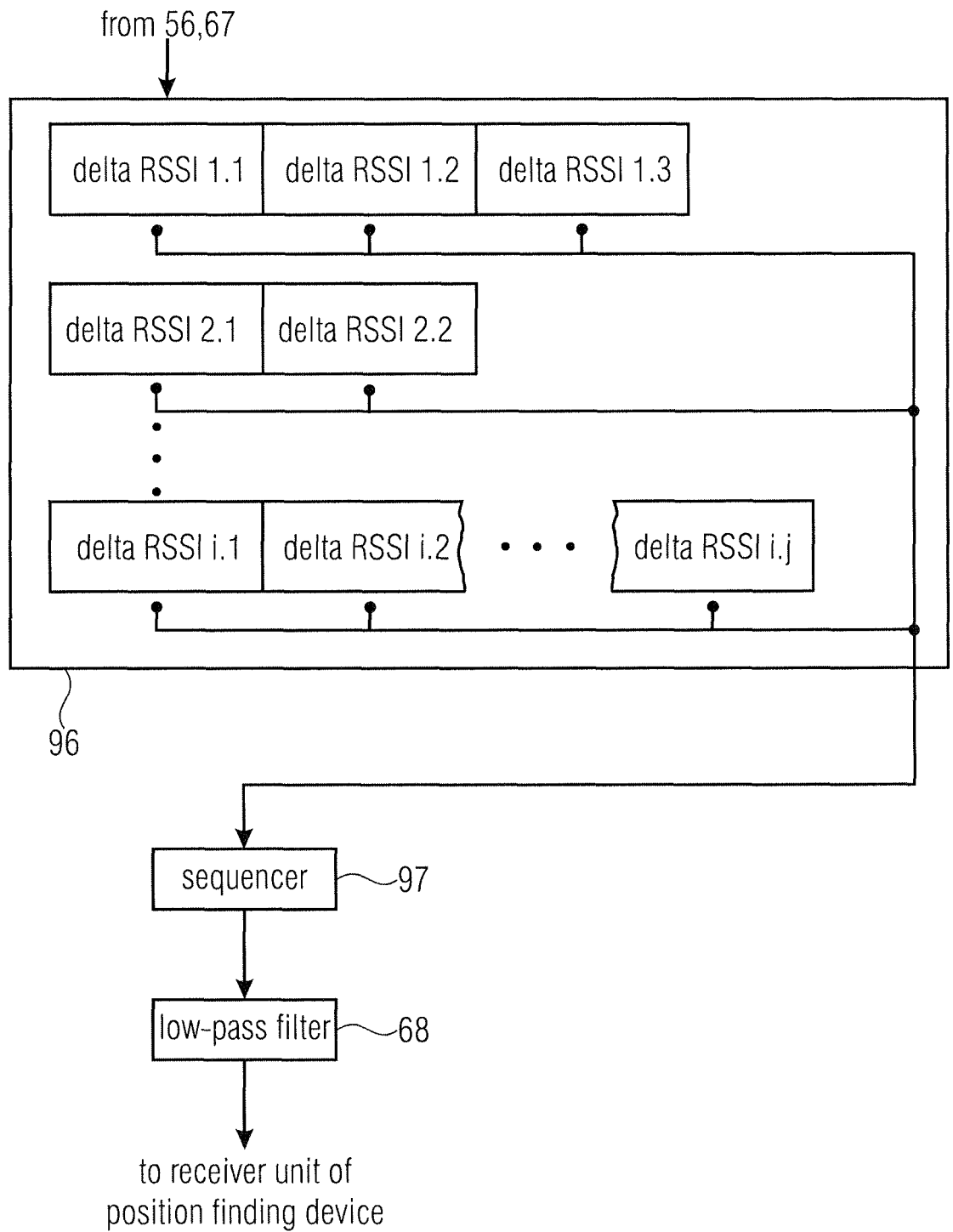
FIG. 9 shows a schematic block diagram of part of the apparatus for calibrating in accordance with an embodiment.

FIG. 9 shows a schematic representation of the supply of filter input values to the low-pass filter 68. The signal strength differences determined in the means for determining the signal strength difference 56, 67 are temporally stored in a data structure 96. The data structure 96 may be organized such that the signal strength difference for a received radio signal pattern as compared to several reference radio signal patterns is stored in vectors of different lengths. The vectors may have different lengths since reference radio signal patterns are more or less sufficiently available within the selection subset, depending on the radio signal pattern received. The vectors within the data structure 96 may be marked in accordance with the time of their being added to the data structure 96, so that the vectors may be read out by a sequencer 97 in this order. The sequencer 97 reads the individual signal strength values of the vector currently read out and forwards them to the low-pass filter 68. Once the vector belonging to a specific radio signal pattern has been read out, it may be deleted within the data structure 96, so that storage space is freed up for newly arriving signal strength differences.

The designation deltaRSSI i.j designates the signal strength difference between the received radio signal pattern i and the reference radio signal pattern j, j corresponding to the numbering within the selection quantity of reference radio signal patterns for the received radio signal pattern i.

Figure 10:
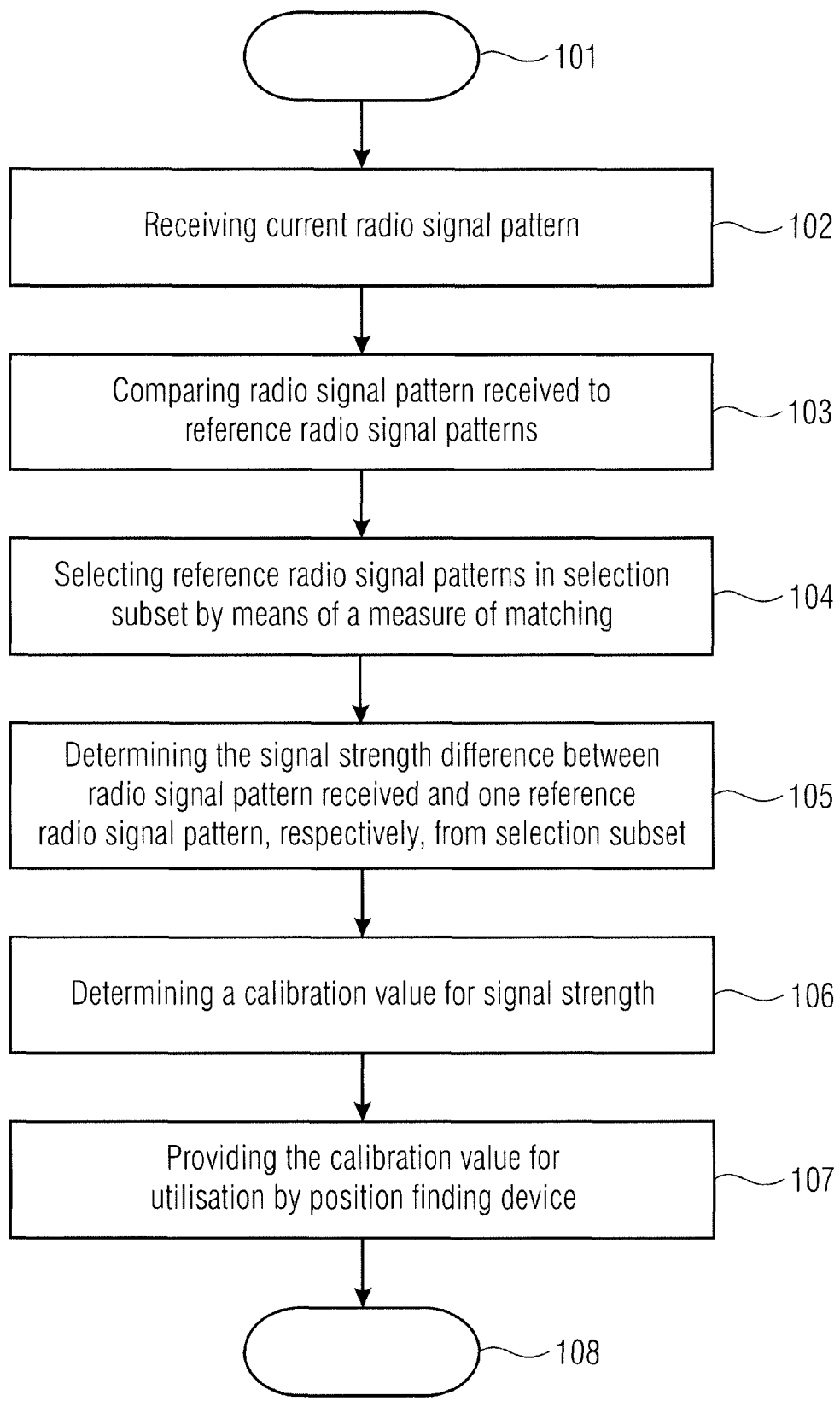
FIG. 10 shows a schematic flowchart of a method of calibrating in accordance with an embodiment of the teaching disclosed here.

FIG. 10 shows a schematic flowchart of a calibration method in accordance with an embodiment of the teaching disclosed herein. Following the start of the method at 101, a current radio signal pattern is received at 102. The calibration method then performs, at 103, a comparison between the received radio signal pattern and a multitude of reference radio signal patterns. On the basis of the comparison performed, one or more reference radio signal patterns are selected into a selection subset. For this purpose, a measure of matching between the received radio signal pattern and one of the reference radio signal patterns, respectively, is evaluated.

For the reference radio signal patterns contained in the selection subset, one signal strength difference is determined, in each case, between the received radio signal pattern and one reference radio signal pattern, respectively (box 105). At 106, a calibration value for the signal strength is determined. This is effected on the basis of the signal strength differences determined, averaging over several signal strength differences typically being performed in order to largely avoid accidental variations of the calibration value. At 107, the calibration method provides the calibration value for utilization on the part of the position finding device. Typically, a receive means of the position finding device will use the calibration value provided. Following successful calibration, the receive means is capable of determining even absolute signal strengths of the received radio signal patterns and/or of the received radio signals with a level of accuracy that is sufficient for position finding purposes. The method ends at 108; it may be repeated periodically, however. For example, it may be performed once per time unit, e.g. once every 10 seconds, 30 seconds, or 60 seconds. The method may also be triggered by special circumstances, e.g. by the reception of a new radio signal pattern.

Even though some aspects were described in connection with an apparatus, it is understood that said aspects also represent a description of the corresponding method, so that a block or a component of an apparatus is also to be understood as a corresponding method step or as a feature of a method step. By analogy therewith, aspects that were described in connection with or as a method step also represent a description of a corresponding block or detail or feature of a corresponding apparatus. Some or all of the method steps may be performed by a hardware device (or while using a hardware device), such as a microprocessor, a programmable computer, or an electronic circuit. In some embodiments, some or all of the most important method steps may be performed by such a device.

Depending on specific implementation requirements, embodiments of the invention may be implemented in hardware or in software. Implementation may be performed using a digital storage medium, for example a floppy disc, a DVD, a Blu-ray disc, a CD, a ROM, a PROM, an EPROM, an EEPROM, or a flash memory, a hard disc or any other magnetic or optical memory which has electronically readable control signals stored thereon that may cooperate, or indeed do cooperate, with a programmable computer system such that the respective method is performed. This is why the digital storage medium may be computer-readable.

Some embodiments in accordance with the invention thus include a data carrier having electronically readable control signals that are capable of cooperating with a programmable computer system such that any of the methods described herein is performed.

Generally, embodiments of the present invention may be implemented as a computer program product having a program code, the program code being operative to perform any of the methods when the computer program product runs on a computer.

The program code may also be stored on a machine-readable carrier, for example.

Other embodiments include the computer program for performing any of the methods described herein, the computer program being stored on a machine-readable carrier.

In other words, an embodiment of the inventive method thus is a computer program having a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of data may be configured, e.g., to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes an apparatus or a system configured to transmit a computer program for performing any of the methods described herein to a receiver. The transmission may be effected electronically or optically, for example. The receiver may be a computer, a mobile device, a storage device, or a similar apparatus, for example. The apparatus or the system may include, e.g., a file server for transmitting the computer program to the receiver.

In some embodiments, a programmable logic device (e.g. a field-programmable gate array, an FPGA) may be used for performing some or all of the functionalities of the methods described herein. In some embodiments, a field-programmable gate array may cooperate with a microprocessor to perform any of the methods described herein. In some embodiments, the methods are generally performed by any hardware device. The latter may be a universally employable hardware such as a computer processor (CPU) or a hardware specific to the method, such as an ASIC, for example.

The above-described embodiments merely represent an illustration of the principles of the present invention. It is to be understood that modifications and variations of the arrangements and details described herein will be appreciated by other persons skilled in the art. This is why it is intended that the invention be limited only by the scope of the following claims rather than by the specific details that were presented herein by means of the description and the explanation of the embodiments.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for calibrating a position finding device, comprising:
a comparer configured to compare a received radio signal pattern to a multitude of reference radio signal patterns, the comparer being configured to select a selection subset from the multitude of reference radio signal patterns according to a measure of matching between the received radio signal pattern and one reference radio signal pattern, respectively, from the multitude of reference radio signal patterns;
a determiner configured to determine a signal strength difference pattern between the received radio signal pattern and the reference radio signal pattern, respectively, of the selection subset; and
a determiner configured to determine a calibration value based on the signal strength difference pattern and to provide the calibration value to the position finding device to use the calibration value to accordingly correct signal strengths determined by the position finding device, the received radio signal pattern comprises at least one of transmitter IDs of receivable radio transmitters and signal strengths of received radio signals,
wherein the comparer is further configured to relate relative signal strengths for different ones of the transmitter IDs within the received radio signal pattern to corresponding relative signal strengths within the respective one of the multitude of reference radio signal patterns and to infer the measure of matching therefrom; and
wherein the comparer is configured to select the reference radio signal patterns for the selection subset which meets the following criteria related to an accuracy (ACC) of measure-of-matching values:

$$ACC_i \leq ACC_{max}$$

$$ACC_i \leq ACC_{Th}$$

$$ACC_{max} = ACC_0 \cdot \text{LIMIT},$$

wherein $ACC_0$ is a measure-of-matching value of the reference radio signal pattern including the currently best match, $ACC_{Th}$ is a threshold value for the measure of matching with regard to inclusion into the selection subset, $ACC_i$ is a measure-of-matching value related to the received radio signal pattern as against the reference radio signal pattern, and LIMIT is a value related to a tolerance range of $ACC_Q$.

2. The apparatus as claimed in claim 1, wherein the determiner comprises a low-pass filter which filters at least the signal strength difference or the calibration value.

3. The apparatus as claimed in claim 2, wherein the low-pass filter is a recursive filter comprising a filter input coefficient and a filter feedback coefficient, the filter feedback coefficient being larger than ten times the filter input coefficient.

4. The apparatus as claimed in claim 2, wherein the low-pass filter is configured to determine an averaged signal strength difference from a multitude of individual signal strength differences.

5. The apparatus as claimed in claim 4, wherein the multitude of individual signal strength differences correspond to signal strength differences within the reference radio signal pattern among the multitude of reference radio signal patterns based on the radio transmitters taken into account in the reference radio signal pattern, and wherein the multitude of individual signal strength differences serve as input quantities for the low-pass filter.

6. The apparatus as claimed in claim 1, wherein the measure of matching is indifferent regarding absolute signal strengths of the received radio signal pattern and the reference radio signal pattern.

7. The apparatus as claimed in claim 1, wherein the comparer is configured to compare the measure of matching to a threshold value $ACC_{Th}$, wherein the received radio signal pattern and a specific reference radio signal pattern will be comprised, with respect to each other into the selection subset if the measure of matching between the reference radio signal pattern and the specific reference radio signal pattern meets a condition defined by the threshold value $ACC_{Th}$, and wherein the received radio signal pattern and the specific reference radio signal pattern will not be comprised, into the selection subset if the measure of matching does not meet the condition defined by the threshold value $ACC_{Th}$.

8. The apparatus as claimed in claim 1, wherein the comparer is configured to select, for the selection subset, the reference radio signal patterns whose measures of matching with the received radio signal pattern are within a tolerance range comprising a best measure-of-matching value.

9. The apparatus as claimed in claim 8, wherein the tolerance range extends at least on one side from the best measure-of-matching value over a tolerance range amounting to 30% of the best measure-of-matching value.

10. A position finding device for radio-based localization, comprising:
the apparatus for calibrating as claimed in claim 1; and
a receiver configured to receive radio signals and configured to receive the calibration value generated by the apparatus for calibrating and to scale the radio signals according to the generated calibration value so that any scaled radio signal data output by the receiver corresponds, in terms of signal strength, to reference signal data with which the radio signal data is compared.

11. The position finding device as claimed in claim 10, wherein a mode of operation of the position finding device is based on a fingerprinting principle.

12. A method of calibrating a position finding device based on radio-based localization, comprising:

comparing a received radio signal pattern to a multitude of reference radio signal patterns;

selecting reference radio signal patterns from the multitude of reference radio signal patterns into a selection subset according to a measure of matching between the received radio signal pattern and one reference radio signal pattern, respectively, from the multitude of reference radio signal patterns;

determining a signal strength difference pattern between the received radio signal pattern and the reference radio signal pattern, respectively, of the selection subset; and determining a calibration value for the signal strength and providing the calibration value for utilization by the position finding device to accordingly correct signal strengths determined by the position finding device, wherein the received radio signal pattern comprises at least one of transmitter IDs of receivable radio transmitters and signal strengths of receivable radio signals, and the step of comparing the received radio signal pattern to the multitude of reference radio signal patterns relates relative signal strengths for different ones of the transmitter IDs within the received radio signal pattern to corresponding relative signal strengths within the respective one reference pattern, and infers the measure of matching therefrom, wherein comparing the received radio signal pattern to the multitude of reference radio signal patterns includes selecting the reference radio signal patterns for the selection subset which meets the following criteria related to an accuracy (ACC) of measure-of-matching values:

$ACC_i \leq ACC_{max}$ $ACC_i \leq ACC_{Th}$ $ACC_{max} = ACC_0 \cdot \text{LIMIT}$, wherein $ACC_0$ is a measure-of-matching value of the reference radio signal pattern including the currently best match, $ACC_{Th}$ is a threshold value for the measure of matching with regard to inclusion into the selection subset, $ACC_i$ is a measure-of-matching value related to the received radio signal pattern as against the reference radio signal pattern, and LIMIT is a value related to a tolerance range of $ACC_0$.

13. A non-transitory computer readable medium including a computer program for performing, when the computer program runs on a processor or microcontroller, a method of calibrating a position finding device based on radio-based localization, comprising: comparing a received radio signal pattern to a multitude of reference radio signal patterns; selecting a reference radio signal pattern from the multitude of reference radio signal patterns into a selection subset according to a measure of matching between the received radio signal pattern and the reference radio signal pattern, respectively, from the multitude of reference radio signal patterns; determining a signal strength difference pattern between the received radio signal pattern and the reference radio signal pattern, respectively, of the selection subset; and determining a calibration value for the signal strength and providing the calibration value for utilization by the position finding device to accordingly correct signal strengths determined by the position finding device, wherein the received radio signal pattern comprises at least one of transmitter IDs of receivable radio transmitters and signal strengths of receivable radio signals, and the step of comparing the received radio signal pattern to the multitude of reference radio signal patterns relates relative signal strengths for different ones of the transmitter IDs within the received radio signal pattern to corresponding relative signal strengths within the respective one reference pattern, and infers the measure of matching therefrom, wherein comparing the received radio signal pattern to the multitude of reference radio signal patterns includes selecting the reference radio signal patterns for the selection subset which meets the following criteria related to an accuracy (ACC) of measure-of-matching values:

$ACC_i \leq ACC_{max}$ $ACC_i \leq ACC_{Th}$ $ACC_{max} = ACC_0 \cdot \text{LIMIT}$, wherein $ACC_0$ is a measure-of-matching value of the reference radio signal pattern including the currently best match, $ACC_{Th}$ is a threshold value for the measure of matching with regard to inclusion into the selection subset, $ACC_i$ is a measure-of-matching value related to the received radio signal pattern as against the reference radio signal pattern, and LIMIT is a value related to a tolerance range of $ACC_0$.

* * * * *